(12) United States Patent
Kuntz et al.

(10) Patent No.: US 6,641,874 B2
(45) Date of Patent: Nov. 4, 2003

(54) MULTILAYER REFLECTIVE FILM OR PIGMENT WITH VIEWING ANGLE DEPENDENT REFLECTION CHARACTERISTICS

(75) Inventors: Matthias Kuntz, Darmstadt (DE); Hans-Dieter Brueckner, Darmstadt (DE); David Coates, Darmstadt (DE); Rodney Riddle, Damstadt (DE)

(73) Assignee: Merck Patent Gesellschaft mit beschraenkter Haftung, Darmstadt (DE)

( * ) Notice: Subject to any disclaimer, the term of this patent is extended or adjusted under 35 U.S.C. 154(b) by 0 days.

(21) Appl. No.: 09/796,732

(22) Filed: Mar. 2, 2001

(65) Prior Publication Data
US 2002/0022093 A1 Feb. 21, 2002

(30) Foreign Application Priority Data
Mar. 2, 2000 (EP) .......................... 00104413

(51) Int. Cl.⁷ .................................. B44F 1/10
(52) U.S. Cl. .................. 428/29; 428/1.1; 428/1.31; 428/199; 359/493; 359/497; 252/299.01; 252/582
(58) Field of Search .................. 428/29, 1.1, 1.31, 428/199; 359/493, 497; 252/299.01, 582

(56) References Cited

U.S. PATENT DOCUMENTS

| | | | | |
|---|---|---|---|---|
| 3,682,531 A | * | 8/1972 | Jeffers ..................... | 359/493 |
| 4,647,157 A | * | 3/1987 | Chiklis ..................... | 349/96 |
| 4,900,611 A | * | 2/1990 | Carroll, Jr. ............... | 428/216 |
| 5,982,464 A | * | 11/1999 | Wang et al. ............... | 349/106 |
| 6,166,790 A | * | 12/2000 | Kameyama et al. ......... | 349/175 |
| 6,356,164 B1 | * | 3/2002 | Rowatt .................... | 333/21 A |
| 6,420,001 B1 | * | 7/2002 | Coates et al. ............. | 252/299.01 |
| 2002/0003593 A1 | * | 1/2002 | Arakawa et al. ........... | 349/65 |

FOREIGN PATENT DOCUMENTS

JP  2001-305520  * 10/2001  ......... G02F/1/1335

* cited by examiner

Primary Examiner—Deborah Jones
Assistant Examiner—Vivek Koppikar
(74) Attorney, Agent, or Firm—Millen, White, Zelano & Branigan, P.C.

(57) ABSTRACT

The invention relates to multilayer reflective films and pigments showing selective reflection of light wherein the reflection characteristics are dependent on the viewing angle, characterized in that they comprises at least one reflective layer, at least one circular polarizing layer and optionally at least one optical retardation layer. The invention further relates to the use of these multilayer reflective films and pigments in optical elements, as coatings or in lacquers, inks or paints for cosmetic, decorative or security applications, to inks and paints comprising one or more multilayer reflective pigments dispersed in a light transmissive binder, and to security markings or devices comprising one or more multilayer reflective films or pigments.

20 Claims, No Drawings

MULTILAYER REFLECTIVE FILM OR PIGMENT WITH VIEWING ANGLE DEPENDENT REFLECTION CHARACTERISTICS

The invention relates to multilayer reflective films and pigments showing selective reflection of light wherein the reflection characteristics are dependent on the viewing angle. The invention further relates to the use of these multilayer reflective films and pigments in optical elements, as coatings or in lacquers, inks or paints for cosmetic, decorative or security applications. The invention also relates to inks and paints comprising one or more multilayer reflective pigments dispersed in a light transmissive binder, and to security markings or devices comprising one or more multilayer reflective films or pigments.

Reflective pigments, films or coatings showing viewing angle dependent reflection of light are known in prior art. For example, platelet shaped multilayer interference pigments are known, e.g. from DE 19618563, DE 19618569 and DE 197 46 067, that consist of a platelet shaped substrate, e.g. mica, onto which are coated one or more refractive layers e.g. of metal oxide, and that show iridescent reflection colors that are changing with varying viewing angle.

Furthermore, holographic films of platelet shaped pigments are known, e.g. from EP 0 728 329, which comprise a structured reflecting surface leading to interference effects of incident light reflected by the lower and higher regions of the structured surface. The interference colors are also depending on the viewing angle.

The above described angle dependent color effects can be exploited in various applications, such as inks or lacquers for decorative use like e.g. for car bodies, or security uses like non-forgeable markings on banknotes or documents of value.

The reflective layers, pigments and coatings of prior art do have several drawbacks. Thus, they often show low chemical stability and do not stand the banknote test. Furthermore, they cannot be coupled or combined with security products, like for instance holograms, kinegrams etc. However, such a combination is strongly desirable, since a combination of two security devices would increase security, according to experiences from the security market. As a consequence, the existing films, coatings and pigments have only limited value for security applications.

It was an aim of the present invention to provide reflective films and pigments that do not show the drawbacks of prior art films and pigments as mentioned above. Another aim of the present invention was to provide methods of manufacturing such films and pigments that are especially suitable for mass production. Other aims of the present invention are immediately obvious to the expert from the following description.

The inventors have found that particularly striking viewing angle dependent color effects can be achieved by providing a multilayer pigment, film or coating according to the present invention, which comprises a reflective layer, e.g. a metal layer, covered on one or both sides with a circular polarizing layer. The color effect can be further enhanced by inserting an optical retardation layer between the reflective layer and the circular polarizing layer, leading to a shift of the reflected wavelength. Thereby, a larger color change and a shift of the reflection colors are achieved.

One embodiment of the invention is a multilayer reflective film or multilayer reflective pigment showing selective reflection of light, wherein the reflection characteristics, in particular the central wavelength of reflection, are dependent on the viewing angle, characterized in that it comprises at least one reflective layer, at least one circular polarizing layer and optionally at least one optical retardation layer. The polarizing layer and optical retardation layer can be present on the reflective layer in any order.

Another embodiment of the invention are platelet shaped pigments obtainable by grinding an inventive multilayer reflective film.

Another embodiment of the invention is the use of inventive multilayer reflective films and pigments in optical elements, as coatings or in lacquers, inks or paints for cosmetic, decorative or security applications.

Another embodiment of the invention is an ink, lacquer or paint comprising one or more inventive multilayer reflective pigments dispersed in a light transmissive binder.

Another embodiment of the invention is a security marking or device comprising one or more inventive multilayer reflective films or pigments.

Other embodiments of the invention will be readily apparent to those of skill in the art.

The term 'film' as used in this application includes self-supporting, i.e. free-standing, films that show more or less pronounced mechanical stability and flexibility, as well as coatings or layers on a supporting substrate or between two substrates.

The term 'liquid crystal or mesogenic material' or 'liquid crystal or mesogenic compound' denotes materials or compounds comprising one or more rod-shaped, board-shaped or disk-shaped mesogenic groups, i.e. groups with the ability to induce liquid crystal phase behavior. The compounds or materials comprising mesogenic groups do not necessarily have to exhibit a liquid crystal phase themselves. It is also possible that they show liquid crystal phase behavior only in mixtures with other compounds, or when the mesogenic compounds or materials, or the mixtures thereof, are polymerized.

Suitable binder systems are, e.g., polyesters, alkyd resins, polyurethanes, (meth)acrylate copolymers and resins based on cellulose esters, which may also be dissolved or dispersed in an organic solvent. Alternatively, water soluble binders may also be used, e.g., water soluble polymers selected from polyesters, poly(meth)acrylates and polyurethanes. It is also possible to cover the coating comprising the interference pigments and the transparent binder by a second coating as a clear coating. Suitable methods and components are disclosed in WO 97/27252.

Preferred embodiments of the invention include
a multilayer film or pigment comprising one or more circular polarizing layers and optionally one or more optical retardation layers coated on a reflective substrate,
a multilayer reflective film or pigment wherein the circular polarizing layer comprises a linear polarizer and a quarter wave retardation layer,
a multilayer reflective film or pigment wherein the circular polarizing layer comprises a linear polarizer and a quarter wave retardation layer, and wherein the linear polarizer and/or the quarter wave retardation layer comprise a vitrifed, polymerized or crosslinked liquid crystal material with uniform orientation,
a multilayer reflective film or pigment wherein the circular polarizing layer comprises a linear polarizer and a quarter wave retardation layer, and wherein the quarter wave retardation layer is a stretched or compressed film of isotropic polymer,
a multilayer reflective film or pigment comprising at least one reflective layer, at least one circular polarizing layer and at least one optical retardation layer, wherein said optical retardation layer is a quarter wave retardation layer, a multilayer reflective film or pigment comprising one central reflective layer, and further comprising one or more circular polarizing layers and one or more optical retardation layers on each side of the reflective layer, wherein the circular polarizing layers are sandwiching the retardation layers, a multilayer reflective film or pigment wherein the reflective layer is a metal layer, a multilayer reflective film or pigment wherein the reflective layer is a holographic reflective layer, a multilayer reflective pigment wherein the reflective layer is an interference pigment, a multilayer reflective film wherein the reflective layer comprises one or more interference pigments, preferably provided in a light transmissive binder, a multilayer reflective film-wherein the reflective layer in addition to the interference pigments additionally comprises one or more further pigments or dyes.

A first preferred embodiment of the present invention relates to a multilayer reflective film comprising a reflective film or layer that is covered with a circular polarizing layer.

The circular polarizing layer can be e.g. a combination of a linear polarizer and a quarter wave retardation layer, foil or film, hereinafter abbreviated as QWF. The QWF transfers the linear polarized light transmitted through the linear polarizer into circularly polarized light.

Linear polarizers suitable for this embodiment are any known in the art. Thus, e.g. standard linear absorption polarizers can be used comprising an uniaxially stretched polymer film of e.g. polyvinyl alcohol, or comprising a polymer film into which is incorporated a dichroic dye.

The circular polarizing layer can be applied e.g. by laminating a combination of a linear polarizer film and a QWF onto the reflective layer.

Preferably the linear polarizer comprises a vitrified, polymerized or crosslinked liquid crystal (LC) material that exhibits macroscopically uniform planar orientation, i.e. with the mesogenic groups of the LC material being oriented substantially parallel to the plane of the layer into a preferred direction.

The linear polarizer can be prepared e.g. by coating a layer of polymerizable LC material comprising a dye onto a substrate, aligning the LC material into planar orientation, i.e. so that the mesogenic groups are oriented parallel to the plane of the layer, polymerizing or crosslinking the material by exposure to heat or actinic radiation.

For example, a polymerizable LC material can be used comprising a photoinitiator, which is then cured by UV radiation. Suitable methods and materials for this technique are described in D. J. Broer et al., Makromol. Chem. 190, pp. 2255 ff. (1989).

Linear polarizers made from polymerizable material by the above method are described in EP 0 397 263 (Philips).

It is also possible to prepare the linear polarizer by the above method directly on the QWF which serves as a substrate.

It is also possible to prepare the linear polarizer by the above method directly on the reflective layer which serves as a substrate, and then coat or laminate a QWF on top of the linear polarizer.

The QWF preferably exhibits a net retardation that is approximately 0.25 times the wavelength transmitted by the linear polarizer. As a QWF, it is possible to use uniaxially or biaxially stretched or compressed synthetic resin films of e.g. polyethylene terephthalate (PET), polyvinyl alcohol (PVA), polycarbonate (PC), di- or triacetyl cellulose (DAC, TAC). For example PET films are commercially available from ICI Corp. under the trade name Melinex. Especially preferred are PVA and PET films.

It is also possible to use as QWF a retardation film comprising vitrified, polymerized or crosslinked liquid crystalline material with planar orientation, i.e. with the mesogenic groups of the liquid crystal material being oriented substantially parallel to the plane of the layer into a preferred direction.

A QWF comprising polymerized LC material with planar orientation is described in WO 98/04651.

It is also possible to use as QWF a retardation film comprising one or more layers of a polymerized liquid crystalline material with tilted orientation, i.e. with the mesogenic groups of the liquid crystal material are oriented at an oblique angle relative to the plane of the layer into a preferred direction. Such a QWF is described in WO 98/12584.

The QWF can be prepared e.g. by coating a layer of polymerizable LC material onto a substrate, aligning the LC material into the desired orientation, polymerizing or crosslinking the material by exposure to heat or actinic radiation. The linear polarizer may then be laminated or coated on top of the QWF.

It is also possible to prepare the QWF by the above method directly on the linear polarizer which serves as a substrate.

It is also possible to prepare the QWF by the above method directly on the reflective layer which serves as a substrate, and then coat or laminate a linear polarizer on top of the QWF.

In another preferred embodiment of the present invention, the circular polarizing layer comprises platelet shaped microflakes obtained by grinding a circular polarizing film prepared as mentioned above into small flakes, which are then incorporated into a light transmissive binder system and coated onto the reflective layer.

It is also possible to prepare small flakes from a linear polarizer film and from a QWF separately. The linear polarizing flakes and the QWF flakes are then each incorporated into a light transmissive binder system to form the linear polarizing layer and QWF layer, respectively.

Alternatively, the linear polarizing flakes and QWF flakes are mixed, incorporated together into a light transmissive binder system and coated onto the reflective layer.

The thickness of the linear polarizer is preferably from 0.1 to 10 $\mu$m, in particular from 0.2 to 4 $\mu$m, most preferably from 0.5 to 1 $\mu$m.

The thickness of the QWF is preferably from 0.1 to 10 $\mu$m, in particular from 0.2 to 5 $\mu$m, most preferably from 0.7 to 2 $\mu$m.

The total thickness of the circular polarizing layer is preferably from 0.2 to 20 $\mu$m, in particular from 0.4 to 10 $\mu$m, most preferably from 0.7 to 3 $\mu$m.

It is also possible to use a linear polarizer and/or QWF with a thickness larger than 10 $\mu$m.

For the reflective layer in principle any reflective material can be used. The reflective layer is preferably a metal film of e.g Al, Cu, Ni, Ag, Cr or alloys like e.g. Pt—Rh or Ni—Cr. Such metal layers can be prepared e.g. by vacuum deposition or sputtering and typically show a thickness of e.g. 50 to 100 Å.

Further preferred are reflective layers comprising one or more metal flakes of e.g. aluminium, gold or titanium, or metal oxide flakes of e.g. $Fe_2O_3$ and/or $TiO_2$. Especially preferred are reflective layers comprising one or more pearlescent pigment flakes comprising a substrate of e.g. mica, $SiO_2$, $Al_2O_3$, $TiO_2$ or glass that is coated with one or more layers of e.g. titanium dioxide, iron oxide, titanium iron oxide or chrome oxide or combinations thereof, or flakes comprising combinations of metal and metal oxide. Further preferred are e.g metal flakes of e.g. aluminium coated with layers of iron oxide layers and/or silicon dioxide. Particularly suitable pearlescent pigments are e.g. the commercially available Iriodin, Xirallic or Colourstream (from Merck KGaA, Darmstadt, Germany), or Paliochrome (from BASF AG, Ludwigshafen, Germany). Further suitable pigments are optically variable pigments like e.g. Flex pigments, comprising a substrate of e.g. aluminium that is sandwiched between layers of e.g. MgF and coated with top layers of e.g. chrome or molybdenum. Further suitable are metallic, e.g. aluminium, pigment flakes (from Eckart, Germany).

For use as reflective layer the above pigments are preferably dispersed in a light transmissive binder.

Alternatively, it is possible to use as reflecting layer any conventional hologram or kinegram.

Thus, for example a substrate like e.g. a banknote, or selected regions thereof, can be printed or coated with a layer or thread of aluminimum flakes, or the thread can be prepared separately and incorporated into the substrate, by methods that are known to the expert, to form a reflective layer. The reflective layer is optionally covered with a retardation layer or film, and then covered by a circular polarizing layer or film as described for the preferred embodiments above.

This embodiment is particularly suitable for use as false-proof security threads or markings or holograms on banknotes or documents of value, providing an angle dependent visible marking by which the banknote is easy to authenticate.

According to another preferred embodiment the reflective layer is a holographic layer with a structured surface, or a layer of reflective holographic pigments. Light reflected by higher regions of the structured surface will interfer with light reflected by lower regions of the structured surface, thereby forming a holographic image.

Very preferred are multilayer films wherein the holographic reflective layer is covered by a retardation layer leading to a phase shift of reflected light as described above. This leads to an to improved color change and to an improved visibility of the holographic image, which is otherwise often difficult to recognize especially in a bright environment.

Thus, the multilayer reflective films according to the preferred embodiments described above are especially suitable for use in hot stamping foils and holographic foils for the preparation of security markings and security threads.

The preparation of holographic layers is described e.g. in U.S. Pat. No. 4,588,664.

Suitable holographic pigments are e.g. the commercially available pigments from Avery Dennison Corp. (Pasadena, Calif., U.S.A.), DuPont Nemours (Wilmington, Del., U.S.A.) or Spectratek Technologies, Inc., (Los Angeles, Calif., U.S.A.). Holographic pigments are described e.g. in U.S. Pat. No. 5,415,950.

The thickness of the reflective layer is preferably from 5 to 1000 nm, in particular from 20 to 200 nm, very preferably from 30 to 100 nm.

It is also possible to use reflective layers with a thickness larger than 1000 nm.

A second preferred embodiment of the present invention relates to a multilayer reflective film as described above, wherein a retardation layer is provided between the reflective layer and the circular polarizing layer. The retardation layer causes an additional phase shift of the light reflected by the reflective layer. This leads to an increased color change of the multilayer film and to particularly striking angle dependent color effects.

As a retardation layer, it is possible to use uniaxially or biaxially stretched or compressed films of an isotropic polymer, or polymer films comprising vitrified, polymerized or crosslinked liquid crystalline material. Moreover, the retardation layer can independently comprise any of the materials disclosed above for the QWF layer.

Preferably, the retardation layer exhibits a net retardation that is approximately 0.25 times the wavelength transmitted by the circular polarizing layer. Thus, in case the circular polarizing layer is a combination of a linear polarizer and a QWF as described in the preferred embodiment above, the retardation layer can simply be applied by putting another QWF onto the combination of linear polarizer/QWF, or by sandwiching the linear polarizer between two QWFs.

The retardation layer can also comprise platelet shaped microflakes of a light retarding material as mentioned above. Thus, e.g. a retardation film of a stretched polymer or polymerized LC material can be ground into small flakes which are then incorporated into a light transmissive binder system, and coated onto the reflective layer, to form the retardation layer.

The thickness of the retardation layer is preferably from 0.1 to 5 μm, in particular from 0.2 to 2 μm, most preferably from 0.5 to 1 μm.

The multilayer reflective film according to the preferred embodiments described above can be directly applied to decorating objects, car bodies or any object with a reflective surface by known techniques, like e.g. foil coating. For example, taxis can be directly coated with such foils.

According to another preferred embodiment, the circular polarizing layer is directly applied onto a metal substrate or the metal surface of an object which serve as reflective layer.

Thus, metal objects like, e.g., car bodies, household objects, e.g., lamps, toasters, other appliances, etc., or other objects can be coated or covered directly with an inventive multilayer film. Furthermore, the objects can be coated in separate steps with a layer or film of circular polarizing material and optionally a retardation layer or film.

Inventive multilayer reflective pigments can be obtained by grinding a multilayer reflective film or the single layers according to the preferred embodiments described above into small particles using known methods.

For examples, platelet shaped pigment flakes can be formed by grinding the multilayer film by means of a pestle and mortar or by using a mechanised grinder or mill. By additional cooling to temperatures below 0° C. the polymer brittleness is increased and grinding is made easier. The resulting powder is then sieved to give pigment flakes of the desired size.

Another preferred method to produce small flakes is milling the polymer film under cooling in a blade mill. This produces a powder of platelet shaped flakes with lateral dimensions from several hundreds of microns to 1 to 2 mm. These flakes can subsequently be ground further in a mortar to give platelets with lateral dimensions smaller than 100 μm. Any other known method to form smaller pigments is also suitable.

A preferred method to produce flakes of spherical shape with dimensions smaller than 100 μm is grinding with a pestle and mortar by hand or in a mechanized mortar mill.

Another method to produce more or less spherical flakes is by milling the polymer film in a ball mill. Depending on the size and the weight of the balls, particles with average dimensions of less than 100 µm, in particular of 5 to 10 µm can be obtained.

Cooling of the sample during grinding or milling can be achieved for example by using a carbon dioxide/acetone bath. Another preferred method of cooling is the addition of dry ice powder or liquid nitrogen to the sample.

In some embodiments it is preferable to add an antistatic agent when milling the polymer material to avoid agglomeration of the particles.

The inventive multilayer reflective pigments prepared from multilayer reflective films preferably have a thickness from 0.8 to 24 µm, in particular from 2 to 10 µm, very preferably from 2.4 to 6 µm, and lateral dimensions preferably from 1 to 300 µm, in particular from 1 to 100 µm, very preferably from 1 to 50 µm.

Another preferred embodiment of the present invention relates to multilayer reflective pigments comprising a platelet shaped substrate with a reflective surface, which is directly coated or printed with one or more layers of circularly polarizing material.

This method is particularly advantageous as it allows direct and easy preparation of multilayer flakes, without the need of a two dimensional film as intermediate product.

As reflective platelet shaped substrate, e.g. aluminium flakes, metal oxide flakes of e.g. $TiO_2$, mica flakes or pearlescent pigment flakes like e.g. the commercially available Iriodin (from Merck KGaA, Darmstadt, Germany), or combined metal—metal oxide (from BASF AG or Flex Corp.) can be used.

These reflective base flakes are then coated with one or more layers of circular polarizing material, or subsequently coated with the materials forming the linear polarizing layer, the QWF layer and the retardation layer as described in the first and second preferred embodiments above.

The base flakes used as reflective substrate preferably have a thickness from 30 nm to 1 µm, in particular from 30 to 300 nm and lateral dimensions preferably from 1 to 300 µm, in particular 1 to 100 µm, very preferably 1 to 50 µm.

The resulting multilayer flakes obtained by directly coating platelet shaped reflective base flakes preferably have a thickness from 1 to 20 µm, in particular from 2 to 10 µm, very preferably from 2.4 to 6 µm, and lateral dimensions preferably from 1 to 300 µm, in particular 1 to 100 µm, very preferably 1 to 50 µm.

For practical use the inventive multilayer pigments can be dispersed in a light transmissive binder.

Suitable binder systems are for example commercially available screen printing inks or car paints from Proell or other suppliers.

A multilayer reflective film or pigment according to the present invention can also comprise circular, reflective and retardation layers as described above which are fabricated separately, and afterwards the single layers are stacked, laminated or pressed together. They can be self-adhesive or connected by means of adhesive layers.

It is also possible that the circular polarizing layer is a film that is separated from the reflective and/or retardation layer, and is applied to these layers only e.g. for the purpose of authentification of a security marking or device.

Thus, a security marking or device according to the present invention can comprise one or more reflective layers or threads and optionally one or more retardation layers or threads. The marking may be visible or not under observation with unpolarized light. The reflective and/or retardation layer may also comprise a pattern or hidden information that is not visible under unpolarized light. Only when applying the circular polarizing layer to the security marking or thread, the characteristic color change of the inventive multilayer reflective film is observed, and the hidden pattern or information in the reflective and/or retardation layer becomes visible.

The inventive multilayer reflective films or pigments can be used for direct application or as effect pigments in inks, paints or lacquers, or as holograms or hot stamping foils for decorative or security applications, to authenticate and prevent counterfeiting of documents of value, for identification of hidden images, informations or patterns.

They can be applied to consumer products or household objects, car bodies, foils, packing materials, clothes or woven fabric, incorporated into plastic, or applied as security markings or threads on documents of value like banknotes, credit cards or ID cards, national ID documents, licenses or any product with monetary value, like stamps, tickets, shares, cheques etc.

Preferred embodiments of the invention as described above relate to multilayer reflective films wherein the circular polarizing layer and/or the retardation layer are comprising a polymerized, crosslinked or vitrified LC material or polymerized LC material, respectively, exhibiting uniform orientation.

Oriented polymerized LC layers are preferably obtained by coating a layer of a polymerizable LC material onto a substrate or between two substrates, aligning the material into planar orientation, and polymerizing the material by exposure to heat or actinic radiation.

Preferably a polymerizable LC material is used that comprises at least one polymerizable mesogen having one polymerizable functional group and at least one polymerizable mesogen having two or more polymerizable functional groups.

In another preferred embodiment the polymerizable LC material comprises polymerizable mesogenic compounds having two or more polymerizable functional groups (di- or multireactive or di- or multifunctional compounds). Upon polymerization of such a mixture a three-dimensional polymer network is formed. A film made of such a network is self-supporting and shows a high mechanical and thermal stability and a low temperature dependence of its physical and optical properties.

By varying the concentration of the multifunctional mesogenic or non mesogenic compounds the crosslink density of the polymer film and thereby its physical and chemical properties such as the glass transition temperature, which is also important for the temperature dependence of the optical properties of the polymerized film, the thermal and mechanical stability or the solvent resistance can be tuned easily.

The polymerizable mesogenic mono-, di- or multireactive compounds can be prepared by methods which are known per se and which are described, for example, in standard works of organic chemistry such as, for example, Houben-Weyl, Methoden der organischen Chemie, Thieme-Verlag, Stuttgart. Typical examples are described for example in WO 93/22397; EP 0 261 712; DE 19504224; DE 4408171 and DE 4405316. The compounds disclosed in these documents, however, are to be regarded merely as examples that do not limit the scope of this invention.

Examples representing especially useful monoreactive polymerizable mesogenic compounds are shown in the following list of compounds, which should, however, be taken only as illustrative and is in no way intended to restrict, but instead to explain the present invention:

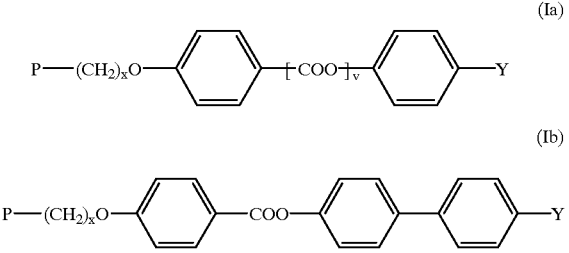
(Ia)

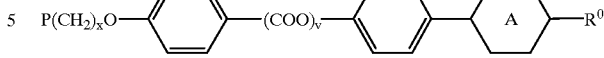
(Ii)

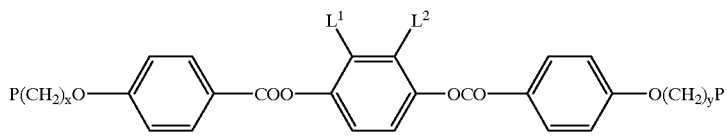
(Ib)

Examples of useful direactive polymerizable mesogenic compounds are shown in the following list of compounds, which should, however, be taken only as illustrative and is in no way intended to restrict, but instead to explain the present invention

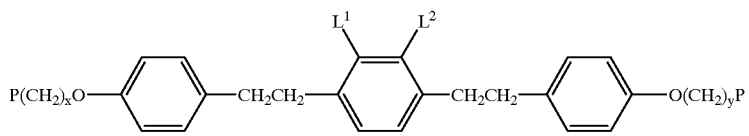
(IIa)

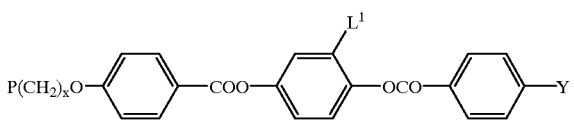
(IIb)

-continued

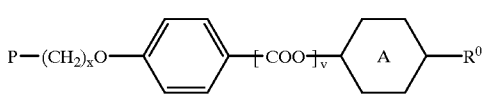
(Ic)

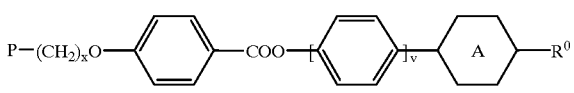
(Id)

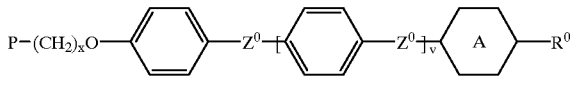
(Ie)

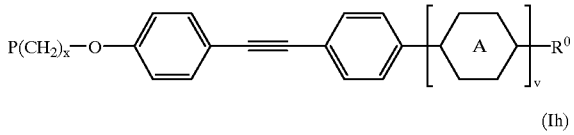
(If)

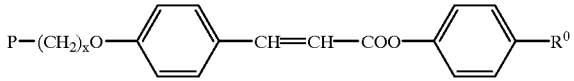
(Ig)

(Ih)

In the above formulae, P is a polymerizable group, preferably an acryl, methacryl, vinyl, vinyloxy, propenyl ether, epoxy or stytryl group, x and y are each independently 1 to 12, A is 1,4-phenylene that is optionally mono- di or trisubstituted by $L^1$ or 1,4-cyclohexylene, v is 0 or 1, $Z^0$ is —COO—, —OCO—, —CH$_2$CH$_2$— or a single bond, Y is a polar group, $R^0$ is a non-polar alkyl or alkoxy group, and $L^1$ and $L^2$ are each independently H, F, Cl, CN or an optionally halogenated alkyl, alkoxy, alkylcarbonyl, alkoxycarbonyl or alkoxycarbonyloxy group with 1 to 7 C atoms.

The term 'polar group' in this connection preferably means a group selected from F, Cl, CN, NO$_2$, OH, OCH$_3$, OCN, SCN, an optionally fluorinated carbonyl or carboxyl group with up to 4 C atoms or a mono- oligo- or polyfluorinated alkyl or alkoxy group with 1 to 4 C atoms.

The term 'non-unpolar group' preferably means an alkyl group with 1 or more, preferably 1 to 12 C atoms or an alkoxy group with 2 or more, preferably 2 to 12 C atoms.

The polymerizable LC material is coated onto substrate, aligned into a uniform orientation and polymerized, as described e.g. in WO 98/12584 or GB 2,315,072, thereby permanently fixing the orientation of the polymerizable mesogenic material.

As a substrate for example a glass or quarz sheet or a plastic film or sheet can be used. It is also possible to put a second substrate on top of the coated mixture prior to and/or during and/or after polymerization. The substrates can be removed after polymerization or not. When using two substrates in case of curing by actinic radiation, at least one substrate has to be transmissive for the actinic radiation used for the polymerization. Isotropic or birefringent substrates can be used. In case the substrate is not removed from the polymerized film after polymerization, preferably isotropic substrates are used.

Preferably at least one substrate is a plastic substrate such as for example a film of polyester such as polyethyleneterephthalate (PET), of polyvinylalcohol (PVA), polycarbonate (PC) or triacetylcellulose (TAC), especially preferably a PET film or a TAC film. As a birefringent substrate for example an uniaxially stretched plastic film can be used. For example PET films are commercially available from ICI Corp. under the trade name Melinex.

The polymerizable LC material can also be dissolved in a solvent, preferably in an organic solvent. The solution is then coated onto the substrate, for example by spin-coating or other known techniques, and the solvent is evaporated off before polymerization. In most cases it is suitable to heat the mixture in order to facilitate the evaporation of the solvent.

Some polymerizable LC materials align spontaneously when coated onto the substrate. Macroscopically uniform planar orientation can further be achieved for example by shearing the material, e.g. by means of a doctor blade. It is also possible to apply an alignment layer, for example a layer of rubbed polyimide or sputtered $SiO_x$, on top of at least one of the substrates.

Planar alignment of the polymerizable LC material can also be achieved by directly rubbing the substrate, i.e. without applying an additional alignment layer. This is a considerable advantage as it allows a significant reduction of the production costs of the optical retardation film. In this way a low tilt angle can easily be achieved.

For example rubbing can be achieved by means of a rubbing cloth, such as a velvet cloth, or with a flat bar coated with a rubbing cloth. In a preferred embodiment of the present invention rubbing is achieved by means of a at least one rubbing roller, like e.g. a fast spinning roller that is brushing across the substrate, or by putting the substrate between at least two rollers, wherein in each case at least one of the rollers is optionally covered with a rubbing cloth. In another preferred embodiment of the present invention rubbing is achieved by wrapping the substrate at least partially at a defined angle around a roller that is preferably coated with a rubbing cloth.

The polymerizable LC material may also comprise one or more surfactants to improve planar alignment. Suitable surfactants are described for example in J. Cognard, Mol.Cryst.Liq.Cryst. 78, Supplement 1, 1–77 (1981). Particularly preferred are non-ionic surfactants, such as the commercially available fluorocarbon surfactants Fluorad 171 (from 3M Co.), or Zonyl FSN (from DuPont). Preferably the polymerizable mixture comprises 0.01 to 5%, in particular 0.1 to 3%, very preferably 0.2 to 2% by weight of surfactants.

The orientation of the polymerizable LC material depends, inter alia, on the film thickness, the type of substrate material, and the composition of the polymerizable mesogenic material. It is therefore possible, by changing these parameters, to control the structure of the film, in particular specific parameters such as the tilt angle and its degree of variation.

Polymerization of the polymerizable LC material takes place by exposing it to heat or actinic radiation. Actinic radiation means irradiation with light, like UV light, IR light or visible light, irradiation with X-rays or gamma rays or irradiation with high energy particles, such as ions or electrons. Preferably polymerization is carried out by UV irradiation.

As a source for actinic radiation for example a single UV lamp or a set of UV lamps can be used. When using a high lamp power the curing time can be reduced. Another possible source for actinic radiation is a laser, like e.g. a UV laser, an IR laser or a visible laser.

The polymerization is carried out in the presence of an initiator absorbing at the wavelength of the actinic radiation. For example, when polymerizing by means of UV light, a photoinitiator can be used that decomposes under UV irradiation to produce free radicals or ions that start the polymerization reaction.

When curing polymerizable mesogens with acrylate or methacrylate groups, preferably a radical photoinitiator is used, when curing polymerizable mesogens vinyl and epoxide groups, preferably a cationic photoinitiator is used.

It is also possible to use a polymerization initiator that decomposes when heated to produce free radicals or ions that start the polymerization.

As a photoinitiator for radical polymerization for example the commercially available Irgacure 651, Irgacure 184, Darocure 1173 or Darocure 4205 (all from Ciba Geigy AG) can be used, whereas in case of cationic photopolymerization the commercially available UVI 6974 (Union Carbide) can be used.

The polymerizable LC material preferably comprises 0.01 to 10%, very preferably 0.05 to 5%, in particular 0.1 to 3% of a polymerization initiator. UV photoinitiators are preferred, in particular radicalic UV photoinitiators.

The curing time is dependening, inter alia, on the reactivity of the polymerizable mesogenic material, the thickness of the coated layer, the type of polymerization initiator and the power of the UV lamp. The curing time according to the invention is preferably not longer than 10 minutes, particularly preferably not longer than 5 minutes and very particularly preferably shorter than 2 minutes. For mass production short curing times of 3 minutes or less, very preferably of 1 minute or less, in particular of 30 seconds or less, are preferred.

In addition to polymerization initiators the polymerizable LC material may also comprise one or more other suitable components such as, for example, catalysts, stabilizers, chain-transfer agents, co-reacting monomers or surface-active compounds. In particular the addition of stabilizers is preferred in order to prevent undesired spontaneous polymerization of the polymerizable material for example during storage.

As stabilizers in principal all compounds can be used that are known to the skilled in the art for this purpose. These compounds are commercially available in a broad variety. Typical examples for stabilizers are 4-ethoxyphenol or butylated hydroxytoluene (BHT).

Other additives, like e.g. chain transfer agents, can also be added to the polymerizable LC material in order to modify the physical properties of the resulting polymer film. When adding a chain transfer agent, such as monofunctional thiol compounds like e.g. dodecane thiol or multifunctional thiol compounds like e.g. trimethylpropane tri(3-mercaptopropionate), to the polymerizable material, the length of the free polymer chains and/or the length of the polymer chains between two crosslinks in the inventive polymer film can be controlled. When the amount of the chain transfer agent is increased, the polymer chain length in the obtained polymer film is decreasing.

It is also possible, in order to increase crosslinking of the polymers, to add up to 20% of a non mesogenic compound with two or more polymerizable functional groups to the polymerizable LC material alternatively or in addition to the di- or multifunctional polymerizable mesogenic compounds to increase crosslinking of the polymer.

Typical examples for difunctional non mesogenic monomers are alkyldiacrylates or alkyldimethacrylates with alkyl groups of 1 to 20 C atoms. Typical examples for non mesogenic monomers with more than two polymerizable groups are trimethylpropanetrimethacrylate or pentaerythritoltetraacrylate.

In another preferred embodiment the mixture of polymerizable material comprises up to 70%, preferably 3 to 50% of a non mesogenic compound with one polymerizable functional group. Typical examples for monofunctional non mesogenic monomers are alkylacrylates or alkylmethacrylates.

It is also possible to add, for example, a quantity of up to 20% by weight of a non polymerizable liquid-crystalline compound to adapt the optical properties of the resulting polymer film.

In some cases it is of advantage to apply a second substrate to aid alignment and exclude oxygen that may inhibit the polymerization.

Alternatively the curing can be carried out under an atmosphere of inert gas. However, curing in air is also possible using suitable photoinitiators and high UV lamp power. When using a cationic photoinitiator oxygen exclusion most often is not needed, but water should be excluded. In a preferred embodiment of the invention the polymerization of the polymerizable mesogenic material is carried out under an atmosphere of inert gas, preferably under a nitrogen atmosphere.

To obtain a polymer film with the desired molecular orientation the polymerization has to be carried out in the liquid crystal phase of the polymerizable LC material. Therefore, preferably polymerizable mesogenic compounds or mixtures with low melting points and broad liquid crystal phase ranges are used. The use of such materials allows to reduce the polymerization temperature, which makes the polymerization process easier and is a considerable advantage especially for mass production.

The selection of suitable polymerization temperatures depends mainly on the clearing point of the polymerizable material and inter alia on the softening point of the substrate. Preferably the polymerization temperature is at least 30 degrees below the clearing temperature of the polymerizable mesogenic mixture.

Polymerization temperatures below 120° C. are preferred. Especially preferred are temperatures below 90° C., in particular temperatures of 60° C. or less.

Without further elaboration, it is believed that one skilled in the art can, using the preceding description, utilize the present invention to its fullest extent. The preferred specific embodiments disclosed herein are, therefore, to be construed as merely illustrative, and not limitative of the remainder of the disclosure in any way whatsoever.

In the foregoing and in the following text, all temperatures are set forth uncorrected in degrees Celsius; and, unless otherwise indicated, all parts and percentages are by weight.

The entire disclosure of all applications, patents and publications, cited above and of corresponding European application No. 00 104 413.0, filed Mar. 2, 2000, are hereby incorporated by reference.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A multilayer reflective film or multilayer reflective pigment comprising at least one reflective layer and at least one circular polarizing layer, said circular polarizing layer comprising a linear polarizing layer and a quarter wave retardation layer, wherein said linear polarizing layer comprises a vitrified, polymerized or crosslinked liquid crystal material with planar orientation and/or said quarter wave retardation layer comprises a vitrified, polymerized or crosslinked liquid crystal material with planar or tilted orientation, and whereby said film or pigment selectively reflects light dependent on the viewing angle.

2. The multilayer reflective film or pigment according to claim 1, further comprising at least one optical retardation layer.

3. The multilayer reflective film or pigment according to claim 1, wherein the linear polarizing layer comprises a vitrified, polymerized or crosslinked liquid crystal material with planar or tilted orientation.

4. The multilayer reflective film or pigment according to claim 3, wherein the quarter wave retardation layer comprise a vitrified, polymerized or crosslinked liquid crystal material with planar or tilted orientation.

5. The multilayer reflective film or pigment according to claim 1, comprising a central reflective layer, at least one circular polarizing layer and at least one optical retardation layer on each side of the reflective layer, wherein the circular polarizing layer is outside the retardation layer.

6. The multilayer reflective film or pigment according to claim 1, wherein the reflective layer is a metal layer.

7. The multilayer reflective film or pigment according to claim 1, wherein the reflective layer is a holographic reflective layer.

8. The multilayer reflective pigment according to claim 1, wherein the reflective layer is an interference pigment.

9. The multilayer reflective film according to claim 1, wherein the reflective layer comprises at least one interference pigment.

10. The multilayer reflective film according to claim 9, wherein the reflective layer additionally comprises at least one further pigment or dye.

11. The multilayer reflective film according to claim 6, wherein the metal layer is an automobile body or household object.

12. A platelet shaped pigment obtainable by grinding a multilayer reflective film according to claim 1.

13. A multilayer pigment according to claim 1, obtainable by coating at least one circular polarizing layer and optionally at least one optical retardation layer onto a platelet shaped reflective substrate.

14. An optical element, in a coating, lacquer, ink or paint for cosmetic, decorative or security applications, said element being a multilayer reflective film or pigment according to claim 1.

15. An ink or paint comprising at least one multilayer reflective pigment according to claim 1, dispersed in a light transmissive binder.

16. A security marking or device comprising at least one multilayer reflective film or pigment according to claim 1.

17. An automobile body or metal household object coated with at least one multilayer reflective film or pigment according to claim 1.

18. The multilayer reflective film or pigment according to claim 1, wherein the linear polarizer comprises an uniaxially stretched polymer film or a polymer film into which is incorporated a dichroic dye comprising an uniaxially stretched polymer film of polyvinyl alcohol, or comprising a polymer film into which is incorporated a dichroic dye.

19. The multilayer reflective film or pigment according to claim 1, wherein the quarter wave retardation layer is a stretched or compressed film of isotropic polymer retardation layer, and wherein the quarter wave retardation layer is a stretched or compressed film of isotropic polymer.

20. The multilayer reflective film or pigment according to claim 1, wherein the linear polarizer and/or the quarter wave retardation layer comprise a vitrified, polymerized or crosslinked liquid crystal material with macroscopically uniform orientation, having mesogenic groups of the liquid crystal material being oriented substantially parallel to the plane of the layer into a preferred direction.

* * * * *